2,794,789

COMPOSITION COMPRISING ALLYL STARCH AND A LOWER ALKYL ITACONATE

Clarence A. Brown, Philadelphia, Pa., assignor to the United States of America as represented by the Secretary of Agriculture No Drawing. Application March 27, 1953,
Serial No. 345,267

2 Claims. (Cl. 260—17.4)

(Granted under Title 35, U. S. Code (1952), sec. 266)

A non-exclusive, irrevocable, royalty-free license in the invention herein described, for all governmental purposes, throughout the world, with power to grant sub-licenses for such purposes, is hereby granted to the Government of the United States of America.

This invention refers to allyl ethers of polyhydroxy compounds, to polymerization of such ethers, to methods of increasing the hardening of such polymers by the formation of certain copolymers and to novel compositions comprising such allyl ethers.

An object of this invention is to provide coating materials which dry or harden rapidly. Another object is to accelerate the polymerization, drying or hardening of coatings comprising allyl ethers of polyhydroxy compounds. Polyallyl ethers of polyhydroxy compounds, such as allyl starch, allylsucrose, allylmannitol, allyl methyl glucoside and allylsorbitol, are excellent coating materials. Films and coatings of these materials air-dry in a manner analogous to the drying oils of paints and varnishes, thus forming hard, glossy, insoluble and infusible coatings. The air-drying or hardening process is relatively slow but can be greatly accelerated by use of a catalytic amount of a conventional metallic paint drier such as a soluble salt of cobalt.

While a coating of an allyl ether of a polyhydroxy compound, if catalyzed with a soluble salt of cobalt, can be thoroughly dried and hardened in a few minutes at an elevated temperature, it requires about 24 hours at room temperature to bring it to the desired degree of hardness. Thus, for the finishing of wooden furniture, for example, where baking is impractical, about a 24 hour interval for each of the several coats is usually required. The time required for finishing thus becomes excessive and makes impractical the use of allyl ether finishes in the furniture industry.

Many of the allyl ethers, especially allyl starch, form extremely brittle films and must be plasticized in order to produce a coating of practical value. In most such cases, the incorporation of a conventional plasticizer, while greatly increasing the flexibility and toughness of the film, decreases the rate of drying and lengthens the time required for the drying of each coat. I have now discovered that esters of itaconic acid, when incorporated into and copolymerized with coating compositions comprising allyl ethers of polyhydroxy compounds, serve two vital functions. First, they function as excellent plasticizers, thus yielding tough, flexible coatings; and second, they unexpectedly accelerate the drying and hardening of the coating. Thus, coatings plasticized with itaconic esters are usually hard enough for rubbing and recoating within 4 to 6 hours instead of the usual 24 hours.

This unexpected valuable property appears to belong uniquely to the itaconic esters. I have tried to use similarly the esters of maleic, fumaric, aconitic, citraconic and acrylic acids, but none of them produced the rapid drying that the itaconates did. Neither did the conventional plasticizers made from phthalic, adipic, or sebacic acid produce the desired results.

Of all the itaconic esters I have used, the lower alkyl esters gave best results, as is illustrated by the following examples.

In the examples shown in the following table, one mil films were cast from solutions of allyl ethers in toluene, or, in the case of allyl starch, in toluene containing 5 percent isobutanol. The solutions also contained 0.1 percent of cobalt drier (based on allyl ether). The films were allowed to dry under normal room conditions and the hardness was determined after 2, 4, and 6 hours.

Table I

| Example No. | Composition, Percent | Sward Hardness after— | | |
|---|---|---|---|---|
| | | 2 hrs. | 4 hrs. | 6 hrs. |
| 1 | Allyl starch, 75 / Plasticizer a, 25 | 8 | 14 | 16 |
| 2 | Allyl starch, 90 / Dimethyl itaconate, 10 | 22 | 32 | 36 |
| 3 | Allyl starch, 80 / Dimethyl itaconate, 20 | 18 | 28 | 30 |
| 4 | Allyl starch, 70 / Dimethyl itaconate, 30 | 16 | 26 | 28 |
| 5 | Allyl starch, 90 / Diethyl itaconate, 10 | 10 | 22 | 24 |
| 6 | Allyl starch, 70 / Plasticizer a, 10 / Dimethyl itaconate, 20 | 15 | 26 | 30 |
| 7 | Allyl starch, 70 / Dimethyl itaconate, 20 / Dibutyl itaconate, 10 | 8 | 20 | 25 |
| 8 | Blown allylsucrose, 80 / Dimethyl itaconate, 20 | | 14 | 18 |
| 9 | Blown allylsucrose | | 4 | 6 |
| 10 | Blown allyl mannitol, 80 / Dimethyl itaconate, 20 | | 8 | 20 |
| 11 | Blown allylmannitol, 90 / Dimethyl itaconate, 10 | | 12 | 16 |
| 12 | Blown allylmannitol | | 8 | 10 | a A highly efficient conventional polymeric plasticizer of the non-drying alkyd type based on sebacic acid, ricinoleic acid, and glycerol.

I have observed that, while dimethyl itaconate is by far the best ester for accelerating the drying of the allyl ether coatings, and effectiveness decreases rapidly as one goes to the ethyl and butyl esters, the plasticizing effect changes in the inverse manner and the butyl ester is a much more effective plasticizer than the methyl or ethyl ester. Hence it might be some times desirable to mix two or more esters, for example, the methyl and the butyl esters, in order to obtain both rapid drying and effective plasticization. Similarly, an itaconate may be combined with a conventional plasticizer; for this use we prefer the dimethyl itaconate because of the rapid drying thus produced.

In addition to the allyl ethers shown, I can use allylsorbitol, allyl pentaerythritol, allylglycerol and similar allyl ethers of polyhydroxy compounds. By polyhydroxy compounds I mean those aliphatic and cycloaliphatic compounds having two or more hydroxyl groups.

I claim:

1. A composition of matter comprising allyl starch and a lower alkyl itaconate in the ratio of about 2 to 10 parts of allyl starch to one part of itaconate.

2. A composition of matter comprising allyl starch and dimethyl itaconate in a ratio of about 2 to 10 parts of allyl starch to 1 part of dimethyl itaconate.

References Cited in the file of this patent

UNITED STATES PATENTS 2,273,891   Pollack et al. _____ Feb. 24, 1942
2,279,881   D'Alelio _____ Apr. 14, 1942